US012613500B2

(12) United States Patent
Genkin et al.

(10) Patent No.: US 12,613,500 B2
(45) Date of Patent: Apr. 28, 2026

(54) METHOD AND SYSTEM FOR OPTIMIZATION KNOWLEDGE TRANSFER BETWEEN AUTOMATED BUILDINGS

(71) Applicant: TransferScience Labs Inc., Toronto (CA)

(72) Inventors: Michael Genkin, Concord (CA); Jennifer Jane McArthur, Toronto (CA)

(73) Assignee: TransferScience Labs Inc., Toronto (CA)

( * ) Notice: Subject to any disclaimer, the term of this patent is extended or adjusted under 35 U.S.C. 154(b) by 421 days.

(21) Appl. No.: 18/487,472

(22) Filed: Oct. 16, 2023

(65) Prior Publication Data

US 2025/0123604 A1     Apr. 17, 2025

(51) Int. Cl.
*G06N 3/096* (2023.01)
*G05B 13/02* (2006.01)
*G05B 13/04* (2006.01)

(52) U.S. Cl.
CPC ......... *G05B 13/027* (2013.01); *G05B 13/048* (2013.01); *G06N 3/096* (2023.01)

(58) Field of Classification Search
CPC ..... G05B 13/027; G05B 13/048; G06N 3/096
See application file for complete search history.

(56) References Cited

U.S. PATENT DOCUMENTS 9,251,463 B2    2/2016 Cook
10,511,613 B2    12/2019 Chen et al.

| | | |
|---|---|---|
| 11,436,492 B2 | 9/2022 | Lee et al. |
| 11,625,595 B2 | 4/2023 | Kurata et al. |
| 11,636,337 B2 | 4/2023 | Tung et al. |
| 2021/0056388 A1 | 2/2021 | Karg et al. |

(Continued)

FOREIGN PATENT DOCUMENTS

| | | |
|---|---|---|
| CN | 107145946 A | 9/2017 |
| CN | 112330012 A | 2/2021 |
| CN | 113191529 A | 7/2021 |

OTHER PUBLICATIONS

Genkin, McArthur ReLBOT: A Transfer Learning Approach to Minimize Reinforcement Learning Risks in Smart Buildings, Department of Architectural Science, Toronto Metropolitan University, Toronto, Ontario, Canada, pp. 1-27, https://arxiv.org/pdf/2305.00365.pdf, May 2, 2023.

*Primary Examiner* — Mark A Connolly
(74) *Attorney, Agent, or Firm* — Argus Intellectual Enterprise LLC; Jordan Sworen; Daniel Enea

(57) ABSTRACT

A method and system for optimization knowledge transfer between automated buildings is provided. The present invention provides a system that uses transfer learning in conjunction with an intelligent optimization agent to transfer knowledge from an existing, optimized automated building, to a newly commissioning building, to reduce the adverse impact of the intelligent optimization agent's warm-up period. The method of the present invention allows transfer of knowledge gained by optimizing one automated building, to be transferred to another, newly constructed, automated building for which there is no historical energy use data. This allows the newly constructed automated building to reach optimal energy consumption much sooner, resulting in significant financial savings and a reduction in discomfort for building residents.

20 Claims, 5 Drawing Sheets

(56)            References Cited

U.S. PATENT DOCUMENTS

| | | | |
|---|---|---|---|
| 2021/0071897 A1* | 3/2021 | Casa | G06N 3/0464 |
| 2021/0312276 A1* | 10/2021 | Rawat | G06N 3/09 |
| 2023/0055079 A1 | 2/2023 | Wu et al. | |
| 2024/0362479 A1* | 10/2024 | Delgado Fernandez | G06N 3/0442 |

* cited by examiner

METHOD AND SYSTEM FOR OPTIMIZATION KNOWLEDGE TRANSFER BETWEEN AUTOMATED BUILDINGS

BACKGROUND OF THE INVENTION

The present invention relates to knowledge transfer between automated buildings. More specifically, the present invention provides a method and system for optimizing knowledge transfer between automated buildings and overcoming an automated building cold start, as well as donor building selection to improve knowledge transfer therebetween.

Buildings are responsible for approximately 32% of global energy use and 19% of $CO_2$ emissions; further, their longevity as well as the ability to reduce these values have made it a significant priority for emissions reduction. In this context, the ability to manage buildings most efficiently is critical. In temperate climate, the majority of building energy consumption is due to Heating, Ventilation, and Air Conditioning (HVAC) loads. HVAC systems are critical to ensure a healthy and comfortable indoor environment for the building occupants. Chillers (cooling) and boilers (heating) are the most significant HVAC equipment and the ability to optimize their controls offers significant potential for $CO_2$ emissions reduction. Some buildings are equipped with additional energy generation and conservation systems, such as automated shading systems, heat pumps, and others.

Automated buildings aim to optimize energy consumption by applying artificial intelligent algorithms. When an automated building is commissioned, or a traditional building is converted to be an automated building, there is no historical data that could be used to train these algorithms. Therefore, years may pass before a sufficient volume of data, capturing seasonal building performance under a variety of external conditions, has been collected to enable effective application of these machine learning algorithms. This problem is referred to as the automated building 'cold start'. The 'cold start' problem for building energy simulation is a long-recognized problem for data science, particularly recommender systems. In this context, 'cold start' refers to the challenge of predicting energy consumption for a new facility for which no historical data is available; this has been noted as a significant challenge to be overcome to develop building energy efficiency recommender systems.

The cold start problem with respect to HVAC optimization has been addressed through data augmentation. For example, preference maps have been used to expand the dataset for air conditioners (ACs), adding similar data from other ACs to help overcome the cold-start problem and leading to a common deep neural network for all units. For example, one study considered many ACs (37,748) and a large dataset was created, and the resultant model showed results with a median 57.38% achieved energy savings. Another related study considered a large dataset of 53,528 ACs, finding that individual model predictions were insufficient in 76% of cases, while a combined dataset and deep neural network permitted strong (R2=0.8) predictions to be made for all ACs. Similarly, another study used an aggregate dataset to train a common deep learning model (recurrent neural network encoder with multi-layer perceptron architecture) for household energy demand forecasting, significantly increasing predictive accuracy over single-house models.

However, any machine learning technique that relies on data collected in the past to optimize performance in the present, includes significant problems. It can take a long time to collect a sufficient volume of data to enable acceptable algorithm performance. Building life cycles are measured in decades. Seasonal variations in external temperature, humidity, and other environmental factors affect building energy performance.

In contrast, on-line optimization algorithms and techniques, such as Reinforcement Learning (RL), have shown significant promise to address automated building cold starts, but their deployment carries a significant risk, because as the intelligent optimization agent initially explores its action space it could cause significant discomfort to the building residents. Developments in Machine Learning (ML) and cloud computing provide new opportunities for controls optimization. A significant number of studies have explored online controls optimization, demonstrating savings of 30-70%. However, there is limited uptake due to research gaps in the development of data retrieval, analysis, and management processes; services for deployment, maintenance, and calibration of sensors; the high cost of updating physics-based models for performance and energy estimation; inability to scale machine learning algorithms for building energy management; and the lack of case studies. Further underpinning the process challenges is a lack of a supporting computational architecture to integrate ML and Artificial Intelligence (AI) with building systems. RL-based implementation of the Intelligent optimization agent offers significant opportunity to streamline the process, reducing the need for physics-based models, provided the adverse effects of the agent's search can be mitigated.

Furthermore, an on-line Intelligent optimization agent learns by exploring the building's adjustable parameter space. During its initial period of operation, known as the warmup period, the agent's actions are largely random, and could cause significant discomfort to the building's residents because these actions involve adjusting chiller and boiler set points, which in turn, results in changes to the building's internal air temperature. On-line optimization thus carries significant risk for building management companies, and this consideration has inhibited the adoption of on-line optimization algorithms.

ML is used for a range of tasks to support automated buildings, including: data acquisition, data pre-processing, feature extraction, selection, and prediction, and dimension reduction. Within the HVAC domain, building automation systems (BAS) have proven to be a valuable source of data alongside additional energy metering and, in some cases, supplemental equipment controls points and PoE devices. Other automated building management applications of ML include lighting, water management, energy management, indoor environmental control, automated fault detection, and occupant detection.

Different types of ML have demonstrated drawbacks. Supervised learning (classification, regression, ensemble methods, and time-series analysis) has been widely used but requires a significant volume of labeled data, which makes them highly susceptible to the 'cold start' problem described above for both energy management and fault detection applications. Unsupervised learning, primarily using clustering, overcomes this challenge but is computationally expensive and has limited applications. Semi-supervised learning overcomes some of these challenges but has had limited adoption for energy applications. Finally, Reinforcement Learning (RL), as an on-line optimization technique, has had increasing adoption for energy management and HVAC control but suffers from a lack of real-world application due to the risk of causing discomfort to the building residents during the initial training phase.

Transfer Learning (TL) has been identified as offering significant promise to resolve the 'cold start' issue, but the application of TL to RL is recognized as a significant gap requiring additional research provide a robust discussion of the theoretical integration of transfer and reinforcement learning. The rise in application of TL for building energy prediction has been noted however the majority of known practices do not consider it in combination with RL or any other on-line optimization techniques.

The present invention addresses automated building cold start through the application of ML to HVAC controls and energy management via the use of TL to reduce the 'cold start' challenge for intelligent on-line building optimization algorithms. The present invention provides a new technique that uses transfer learning in conjunction with an intelligent optimization agent to transfer knowledge from an existing, optimized automated building, to the newly commissioning building, to reduce the adverse impact of the intelligent optimization agent's warm-up period. The present invention demonstrates improvements of up to 6.2 times in duration, and up to 132 times in prediction variance for the intelligent optimization agent's warm-up period. The method of the present invention allows transfer of knowledge gained by optimizing one automated building, to be transferred to another, newly constructed, automated building for which there is no historical energy use data. This allows the newly constructed automated building to reach optimal energy consumption much sooner, resulting in significant financial savings and a reduction in discomfort for building residents. The method of the present invention also allows for selection of ideal 'donor' building for knowledge transfer.

In light of the devices disclosed in the known art, it is submitted that the present invention substantially diverges in design elements and methods from the known art and consequently it is clear that there is a need in the art for an improvement for a method and system for optimization knowledge transfer between automated buildings. In this regard the instant invention substantially fulfills these needs.

SUMMARY OF THE INVENTION

In view of the foregoing disadvantages inherent in the known types of methods and systems for optimization knowledge transfer between automated buildings now present in the known art. The present invention provides a new method and system wherein the same can be utilized for optimizing knowledge transfer between automated buildings and overcoming an automated building cold start, as well as donor building selection to improve knowledge transfer therebetween.

It is an objective of the present invention to provide a method and system for optimization knowledge transfer between automated buildings, with a specific focus on leveraging donor building data and machine learning for new buildings while avoiding a 'cold start'.

It is another objective of the present invention to provide a method and system for optimization knowledge transfer between automated buildings adapted to address the challenge of limited data availability for newly constructed or retrofitted buildings. Acquiring comprehensive data for each individual building can be time-consuming and impractical. Therefore, the present invention proposes a novel approach that utilizes data from donor buildings—existing buildings with similar characteristics—to approximate the data for the new building.

It is yet another objective of the present invention to provide a method and system for optimization knowledge transfer between automated buildings configured to analyze and learn from sensor data from a transfer building dataset and identifying key correlations between building features, occupancy patterns, and thermal properties, the system can intelligently transfer this knowledge to the target building. This transfer learning enables the system to make accurate predictions and adapt the chiller system's operation based on the unique attributes of the new building.

By leveraging the knowledge gained from transfer buildings and applying it to the target building, the invention significantly reduces the time required to understand the thermal properties of the new structure. This accelerated understanding empowers building managers and operators to implement an optimized chiller/heater plan more efficiently, leading to energy cost savings and improved overall efficiency.

Furthermore, the knowledge transfer mechanism of the present invention contributes to sustainable practices in the construction and operation of automated buildings. By reusing existing data from transfer buildings, the invention promotes resource conservation and reduces the environmental impact associated with data collection and analysis.

It is an objective of the present invention to provide a method and system for optimization knowledge transfer between automated buildings comprising an Artificial Neural Network (ANN) operably connected to a transfer building and an intelligent optimization agent, wherein the ANN is capable of transmitting and receiving data over a communication network, or using portable electronic storage medium. The intelligent optimization agent is configured to perform a target building energy optimization method to predict an action set for the chiller set point of a chilling system for a target building.

It is therefore an object of the present invention to provide a new and improved method and system for knowledge transfer between automated buildings, that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
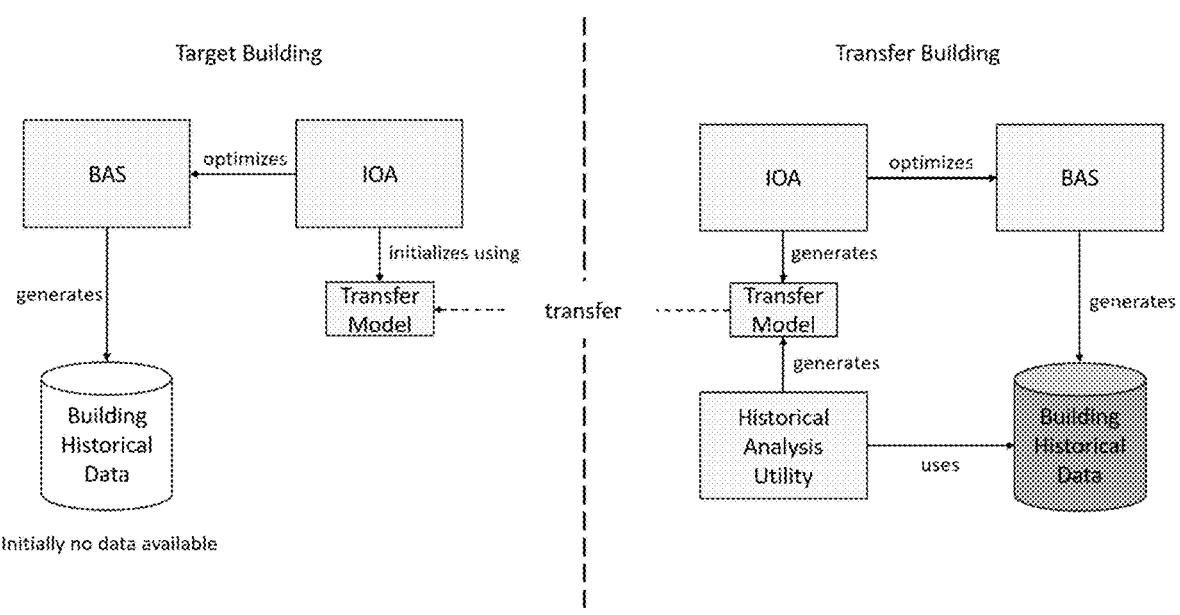
FIG. 1A shows a block diagram of an embodiment of the present invention.

Reference is made herein to the attached drawings. Like reference numerals are used throughout the drawings to depict like or similar elements of the system. For the purpose of presenting a brief and clear description of the present invention, the embodiment discussed will be used for transferring optimization knowledge between automated buildings. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

As used herein, "computer-readable medium" or "memory" excludes any transitory signals, but includes any non-transitory data storage circuitry, e.g., buffers, cache, and queues, within transceivers of transitory signals. As used herein, "logic" refers to (i) logic implemented as computer instructions and/or data within one or more computer processes and/or (ii) logic implemented in electronic circuitry.

The term target building will be used to indicate the building that is being optimized by an intelligent optimization agent for energy performance. The term transfer building will be used to indicate the building that is being used as the source of data for transfer learning. In some embodiments, the transfer building is simulated by an emulator component. In other embodiments, the transfer building is an existing automated building. In yet other embodiments, the transfer building is any suitable structure or architecture configured to provide the source of data for transfer learning to the target building.

The term automated building or building automation is defined as a building having an automatic control of a building's HVAC (heating, ventilation, and air conditioning), electrical, lighting, shading, access control, security systems, and/or other interrelated systems. The automatic control can be centralized or decentralized and can include only a single controllable system or multiple systems within the building that may or may not be interrelated to each other. An automated building can include but is not limited to a smart building, smart home, intelligent building, green homes, or similar commercial or residential properties.

Referring now to FIG. 1A, there is shown a block diagram of an embodiment of the present invention. The diagram represents an architecture illustrating how the Intelligent optimization agents of the target and transfer building are related to each other and the other key components of the target and transfer buildings. In the illustrated embodiment, the system for optimization knowledge transfer between automated buildings comprises an intelligent optimization agent that uses an artificial neural network (ANN) to predict the transfer building performance characteristics. The ANN may be able to transmit and receive data over a communication network, or information captured in the ANN using its weights and biases can be stored on a permanent or temporary storage medium, such as a USB key, and transferred manually. In other embodiments, where an intelligent optimization agent is not available, an off-line utility application (Historical Analysis Utility in FIG. 1A) can be used to train the ANN on transfer building historical data. The transfer building comprises sensor data stored within the ANN and the intelligent optimization agent is configured to leverage the stored sensor data. In some embodiments, the intelligent optimization agent is adapted to select an action from an action set associated with target building automated system. The action set comprises a plurality of set point events for a target building automated system. In the illustrated embodiments and examples, the automated system is a chilling system, and the set point events are related to a chiller temperature or set point. However, in alternate embodiments, the automated system comprises any suitable controllable system or systems within the building that may or may not be interrelated to each other.

The sensor data received from the transfer building by the ANN comprises a plurality of inputs associated with the transfer building automated system (FIG. 1A). Once received, the target building intelligent optimization agent is configured to perform a target building energy optimization method that includes receiving the sensor data from the transfer building ANN, processing the sensor data via multiple segments, selecting the action for the target building automated system from the action set. In some embodiments, the method further comprises sending the action to a building environment component operably connected to a chiller, or other automated device within the automated system, of the target building and automatically adjusts the set point of the target building. In a described embodiment, the intelligent optimization agent comprises deep reinforcement learning or reinforcement learning. However, the intelligent optimization agent is not limited to reinforcement learning to transfer optimization knowledge from one building to another. The intelligent optimization agent is adapted to be implemented using a variety of algorithms configured to search a building parameter based on knowledge accumulated from one or more prior attempts. For example, in some embodiments, the intelligent optimization agent uses an algorithm configured to train neural networks during each sweep of the search using a supervised learning approach. Therefore, in some embodiments, the intelligent optimization agent comprises any algorithm that can leverage knowledge stored by a neural network.

The method described below includes transferring knowledge learned in the transfer building domain $D_s$ to the target building domain $D_t$. In one of the illustrated embodiments, the state of transfer building is described by a feature vector $X_s = \{x_1, \ldots, x_n\} \in X_s$, the transfer building feature space. In the described embodiment below $x_i \in R$.

The label space of the transfer building is denoted as $Y_s$. The predictive task, in the transfer building domain, involves learning an objective function $f_s: X_s \rightarrow Y_s$. The task $T_s = \{Y_s, f(X_s)\}$, is learned from training data $\{x_i, y_i\}$ where $x_i \in X_s$ and $y_i \in Y_s$. The regression task $T_s$ aims to predict the building Coefficient Of Performance (COP) given the input feature vector $X_s$. The COP of the transfer building (any building) can be calculated using the following equation:

$$COP_i = y_i = c_w \rho_w F_{cps} f(T_{in} - T_{out}) \div E_{ch}$$

Where $c_w$ is the specific heat capacity of water, $\rho_w$ is the density of water, $F_{cps}$ is the chiller pump speed, f is the flow rate factor, f is the flow rate factor, $T_{in}$ is the entering chiller temperature, $T_{out}$ is the exiting chiller water temperature, and $E_{ch}$ is the energy consumption rate of the chiller.

Thus, since historical data for the transfer building exist it is possible to construct the label space $Y_s$ and train the predictive function $f(X_s)$ so that it is able to perform the regression task $T_s$ with sufficient accuracy by using standard machine learning approaches. This does require that $X_s$ contain features with values for $F_{cps}$, $T_{in}$, $T_{out}$, and $E_{ch}$. The other terms in the equation are known constants.

There are no historical training datasets that can be used for the target building. This is the fundamental constraint of the cold start scenario that this work aims to address. The intelligent optimization agent aims to solve this problem using an intelligent search algorithm capable of learning, such as actor-critic deep reinforcement learning (see FIG. 2).

The state of target building is described by a feature vector $X_t = \{x_1, \ldots, x_m\} \in X_t$, the transfer building feature space. As with the transfer building, in all cases $x_i \in R$. The label space of the target building in the domain $D_t$ is denoted as $Y_t$.

The intelligent optimization agent actor performs a classification task $$T_t^a.$$

This task involves learning a function $a(X_t)$ that returns the most appropriate action based on the building state represented by $X_t$ and using this function to select the most appropriate action at each step. There are no label data $$Y_t^a$$

for this task, and so the actor shares knowledge with the critic to ensure prediction accuracy.

The predictive task, in the target building domain, involves learning an objective function for the critic $$f_t^c : X_t \to Y_t^c.$$

The critic task $$T_t^c = \{Y_t^c, f_t^c(X_t)\},$$

is learned from training data $\{x_i, y_i\}$ where $$x_i \in X_t \text{ and } y_i \in Y_t^c.$$

The labels $$Y_t^c.$$

for the critic are, just like for the transfer building transfer building label space $Y_t$, are COP value calculated for each input vector $X_t$ using the same formula given above.

Thus, the critic task for the target building $$T_s^c$$

is the same regression task as the regression task for the transfer building $T_s$, and it should be possible to share knowledge:

$$T_s \Longrightarrow T_t^c.$$

The critic shares knowledge $$\omega_t^c$$

with the actor function $a(X_t)$.

In some embodiments, tt should be noted that the dimension of the transfer building input vector n is not the same as the dimension of the target building input vector m, and, therefore, an adaptation function $\alpha_t(X_s, X_t)$ must be introduced to reconcile this difference. The critic is initialized using knowledge $\omega_s$ produced by the target building regression task $T_s$.

The critic is then incrementally retrained after each time that the input vector $X_t$ is presented. Algorithm 1 describes the operation of the intelligent optimization agent that uses an actor-critic reinforcement learning algorithm.

---

Algorithm 1 The ReLBOT main algorithm.

---

Required: $\{X_t\}_{t=1}^k \neq \emptyset$ {Time series containing target building feature vectors.}

Require: $\omega_s$ {Knowledge from the transfer building.}
Require: $\{A\}_{a=1}^j$ {The set of allowed actions.}
Ensure: argmin(R) {Minimize instantaneous reward.}
   {Initialize critic knowledge.}
   for all t do
      initialize $r_t = 0.0$
      for all a do
         predict the instantaneous reward $r_t^a$
         if $r_t^a > r^{a-1}{}_t$ then
            $r_t = r_t^a$
         end if
      end for
      calculate the actual reward $R_t$
      $y_t = Rt$
      incrementally train the critic using $\{Y_t\}_{t=1}^k$
      $T_{t^c} \Rightarrow T_{t^a}$ {Transfer knowledge from critic to actor.}

-continued

| Algorithm 1 The ReLBOT main algorithm. |
| --- |
| end for |

The effectiveness of the transfer learning approach among buildings may vary. It is logical to assume that relatively similar buildings will benefit from transfer learning more than relatively dissimilar ones. It is therefore important to define similarity among buildings mathematically.

In this work similarity between the transfer building and the target building is defined $$S_s^t = s\big(\{X_s\}_{t=i}^k, \{X_t\}_{t=j}^l\big).$$

$$S_s^t \in \mathbb{R} \mid 0 \le \big(\{X_s\}_{t=i}^k, \{X_t\}_{t=j}^l\big) \le 1$$

Using this definition stating that two buildings are completely dissimilar would imply that the buildings have completely dissimilar feature vectors and $$S_s^t = 0.$$

Conversely, stating that two buildings are perfectly similar would imply that their feature vectors are perfectly similar, and that $$S_s^t = 1.$$

In order to calculate similarity some historical data must be available for both the tra $$\big(\{X_s\}_{t=i}^k\big)$$

and the target bui $$\big(\{X_t\}_{t=j}^l\big).$$

These time-series do not need to be the same length, and it is understood that the target building will have less historical data available, but they should contain segments capturing similar seasonality (for example the summer months).

| Algorithm 2 Algorithm for computing similarity between the transfer building and the target building. |
| --- |
| Require: $\{X_s\}_{t=1}^k \neq \varnothing$ {Time series containing transfer building feature vectors.} |
| Require: $\{X_t\}_{t=1}^k \neq \varnothing$ {Time series containing target building feature vectors.} |
| Ensure: $0 \le S_s^t \le 1$ {Return similarity value between 0 and 1.} |
|   $\zeta = 0$ |
|   $\varepsilon = 0$ |
|   for all n do |
|     $k_n = \text{Kurt}[x_n]$ |
|     $sk_n = \text{Skew}[x_n]$ |
|     for all m do |

-continued

| Algorithm 2 Algorithm for computing similarity between the transfer building and the target building. |
| --- |
|       $k_m = \text{Kurt}[x_n]$ |
|       $sk_m = \text{Skew}[x_n]$ |
|       if $(k_n \sim k_m) \,\hat{}\, (sk_n \sim sk_m) \,\hat{}\, (\mu_n \sim \mu_m)$ then |
|         $\zeta = \zeta + 1$ |
|       end if |
|     end for |
|   end for |
|   if n > m then |
|     $\varepsilon = 1 - m/n$ |
|   end if |
|   $S_s^t = \zeta/n - \varepsilon$ |

The algorithm for calculating $$S_s^t$$

is listed in Algorithm 2. The algorithm takes example time-series collected for the transfer building and target building. The algorithm then iterates through all of the features in the transfer building feature vector and tries to find a similar feature in the target building feature vector. Features are considered similar if they have similar normalized kurtosis and skew (both positive or both negative), and means. The means are considered similar if the distance between them is less than the sum of the standard deviation for the transfer building feature and the standard deviation of the target building feature that is being considered.

If the length of the transfer building feature vector n is greater than the length of the target building feature vector m, a penalty ($\varepsilon$ in Algorithm 2) is applied. This is due to the consideration that it will not be possible to transfer all of the knowledge extracted from a richer feature vector.

Figure 1B:
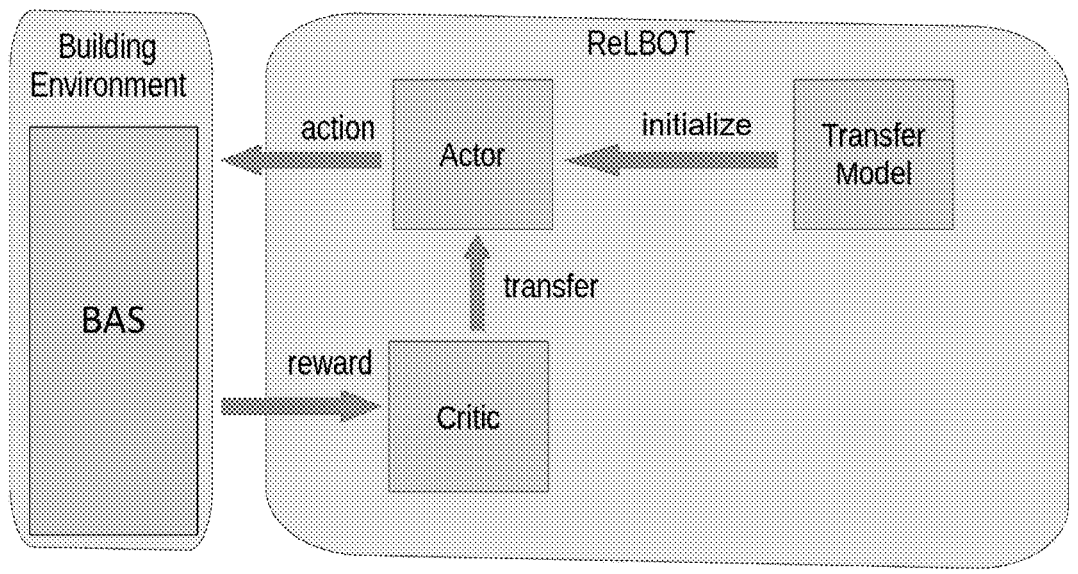
FIG. 1B shows a block diagram of the Intelligent optimization agent implemented using Deep RL (DRL) algorithm-Reinforcement Learning Building Optimizer with Transfer Learning (ReLBOT) architecture of the present invention.

Referring now to FIG. 1B, there is shown a diagram of the Intelligent optimization agent implemented using Deep RL (DRL) algorithm-ReLBOT architecture of the present invention. ReLBOT is an actor-critic deep reinforcement learning agent capable of operating with and without reinforcement learning capabilities. It represents one possible way to implement an intelligent optimization agent. When the reinforcement learning feature is turned off, it operates like a standard deep reinforcement learning actor-critic agent.

Both the Actor and the Critic (see FIG. 1B) are implemented as ANNs. The role of the Actor is to select the best action given an input target building state. The input target building state is a feature vector containing real numbered values read from the many sensors that instrument the building. The state includes all available values for the building sensors, excluding the timestamp and the chiller set point. In this embodiment, the chiller set point is the value that is being acted on by the ReLBOT actor. At any step the ReLBOT Actor can choose from the following actions: do nothing, increase the chiller set point by an amount specified in the ReLBOT configuration file, and decrease the chiller set point by an amount specified in the ReLBOT configuration file. In general, the actions that can be executed by the intelligent optimization agent are defined in a configuration file, and are not limited to the ones specified above.

Once the Actor selects the action based on the current building state, it passes this action to the Building Environment component which, in turn, passes the action to the Building Automation System (BAS). The BAS adjusts the target building chiller set point based on the action selected by the ReLBOT actor. The BAS then measures the building state that will result from this action by collecting and analyzing building sensor data and passes it back to the Building Environment component. The Building Environment Component then calculates the actual reward amount that will be returned to the ReLBOT critic component.

In this embodiment, the Building Environment component implements a reward function that uses the Coefficient Of Performance (COP) to determine the reward that will be used. The COP is the key building energy performance measure used in the civil engineering field. The amount of reward depends on the difference between the COP calculated for the current target building state, adjusted for changes predicted by the transfer building, and the COP calculated for the previous building state. This difference is then multiplied by a configurable scaling factor. In general, the reward calculation is provided in a configuration file, or via a pluggable function, implemented in using computer code.

The Critic (see FIG. 1B) predicts the amount of reward $(r_t)$ that will be returned by the Building Environment component. Once ReLBOT receives the actual reward returned by the Building Environment component $(R_t)$, it uses it as a label $(Y_t)$ to re-train the Critic component. The Critic component is incrementally re-trained at every step. Immediately after re-training ReLBOT uses transfer learning to update the Actor ANN using a sub-set of Critic's weights and biases $$(T_s \Rightarrow T_t^c).$$

The Actor and Critic ANNs have identical input and hidden layers. The only difference is in the output layer, which in the Actor's case performs a classification task (logistic activation) to identify the best action, and in the Critic's case performs a regression task (linear activation) to predict the reward associated with the action.

Figure 2:
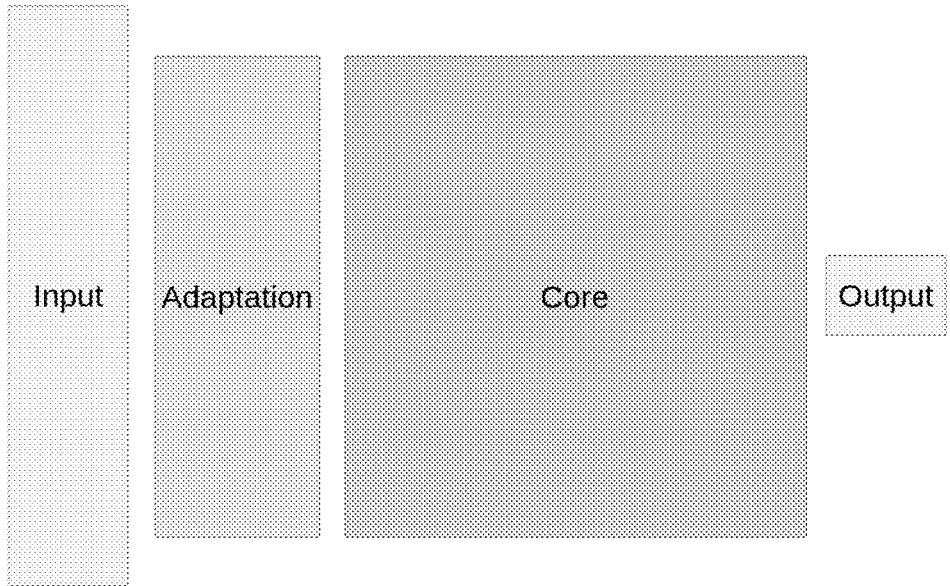
FIG. 2 shows a diagram of ReLBOT and Artificial Neural Networks architecture of the present invention.

Referring now to FIG. 2, there is shown a diagram of a ReLBOT ANN architecture. The ANN models used for both the Actor and Critic components have nearly identical architecture. They are both organized into 4 conceptual segments. (1) An input segment that includes a configurable input layer that adjusts to the size of the target building's feature vector and a hidden layer configured to have the same number of neurons as the input layer. (2) An adaptation segment that includes a hidden layer, with a configurable fixed number of neurons. The number of neurons is the same as in the core segment. The purpose of this layer is to map the variable-size input layer to the fixed size layers of the core segment. This implements the adaptation function $\alpha_t(X_s, X_t)$. (3) A core segment having two hidden layers with a configurable, fixed number of neurons. (4) An output segment that has a single output layer with a single output.

To enable the intelligent optimization agent in some embodiments, the intelligent optimization agent uses an off-line utility to read in the transfer building historical data, calculate the COP and the reward for each step in the time-series, and train the transfer model for the transfer building (FIG. 1A). The transfer model is an ANN with an architecture identical to the ReLBOT Critic component model. When the transfer learning feature is turned on ReLBOT uses transfer learning to copy the weights and biases for the Core model segment from the Transfer model to the Actor and Critic models.

Experiment

Three buildings located in ASHRAE Climate Zone 5 were selected for our experiments. Table 1 summarizes the buildings and describes the specifics of their Heating Ventilation and Air Conditioning (HVAC) systems. The following procedure was followed to collect data and evaluate the intelligent optimization agent algorithms:

1. Data preparation. This involved the following steps:
    (a) Remove any identifying information, such as building name or elements of the address, from the raw data file and column name.
    (b) Impute data for missing values (see discussion above in the 3.2 section).
    (c) Write out the data in CSV format that could be read in by the transfer building and intelligent optimization agent.
2. Train the intelligent optimization agent transfer models for each building.
3. Train the transfer building or models for each building.
4. Organize experiments by building pairs (target building and transfer building) and execute simulated on-line optimization runs using the intelligent optimization agent for each building pair.
5. Aggregate statistics for all runs and metrics (described below).

The below described metrics were selected for investigation because they provide key insights into the intelligent optimization agent behavior, and the effectiveness of the transfer learning technique. The variance in the reward predicted by the Critic is directly related to the choice of action by the Actor, because the Critic and the Actor ANN models share most of the weights and biases. High variance in the predicted reward is thus related to sub-optimal, and more chaotic choice of action selected by the Actor. The period (number of steps) during which the predicted reward variance is much larger than the overall mean predicted reward variance can be used to unambiguously define the length of the warm-up period for the reinforcement-learning agent. This is graphically shown in FIG. 4. The following metrics were used to evaluate the effectiveness of the intelligent optimization agent:

Warm-up reward variance. This metric measures the variance of the reward predicted by the intelligent optimization agent Critic beginning at the very start of the experiment, and until the end of the warm-up period.

Mean reward variance. This metric refers to the mean reward variance observed for the entire experiment.

Warm-up period duration. The duration of the warm-up period is defined as the number of steps in the building state time-series from the very beginning to the first step where the rolling average of the reward variance is equal to or smaller than the mean variance for the entire time-series recorded in the intelligent optimization agent Predictions File.

TABLE 1

| Building ID | Description | Cooling System | Building Age (Years) | Description |
|---|---|---|---|---|
| H | High Efficiency, Semi-Hermetic, Single-Stage, Centrifugal Liquid Chiller with Unit-Mounted VFD | Variable flow chilled water primary system serving two-pipe fan coils in each unit; variable flow condenser loop served by variable speed cooling tower | 11 | 24 story, multi-unit residential building with 351 units |
| T | High Efficiency Semi-Hermetic Single-Stage Centrifugal Liquid Chiller with Unit-Mounted VFD | Variable flow chilled water primary system serving two-pipe fan coils in each unit; variable flow condenser loop served by variable-speed cooling tower | 30 | 21 story, multi-unit residential building with 200 units |
| W | High Efficiency Semi-Hermetic Single-Stage Centrifugal Liquid Chiller with Unit-Mounted VFD | Variable flow chilled water primary system serving two-pipe fan coils in each 16 unit; variable flow condenser loop served by variable-speed cooling tower | 12 | Part of two-tower multi-unit residential complex, each tower with 25 stories, totaling 350 units |

Results

Table 2 presents a summary of findings for our experiments. This table shows relative improvement achieved for the key metrics as times-factor. For all metrics smaller is considered better, and so the time-factor is defined as the metric with transfer learning divided by the corresponding metric without transfer learning. For example, for the building combination T-W, where the target building is T and the transfer building is W, the reduction in the duration of the intelligent optimization agent warm-up period was observed to be 2.34 times shorter with transfer learning than without it. The warm-up reward variance was observed to be 247.48 times smaller with transfer learning than without it. The mean variance was observed to be 17.91 times smaller with transfer learning than without it. In this case transfer learning among buildings clearly produced a dramatic improvement to the speed with which intelligent optimization agent was able to find the COP optimum and minimized the potential discom-fort that would be experienced by the building residents due to excessive exploration of the action space.

Averaged for all six building combinations, it was observed that transfer learning among buildings resulted in: 3.04 times reduction in the duration of the warm-up period. 24.98 times reduction in reward variance during the warm-up period. 7.04 times reduction in mean reward variance.

TABLE 2

| Target Building | Transfer Building | Warm-up Duration Reduction (times) | Warm-up Variance Reduction (times) | Mean Variance Reduction (times) |
|---|---|---|---|---|
| H | T | 4.59 | 4.41 | 2.08 |
| T | H | 1.00 | 3.24 | 3.01 |
| W | T | 1.00 | 1.02 | 1.02 |
| W | H | 1.00 | 1.55 | 1.38 |
| T | W | 6.20 | 131.63 | 31.78 |
| H | W | 4.45 | 8.03 | 2.99 |
| Average | | 3.04 | 24.98 | 7.04 |

For the building combination H-T some of the metrics were observed to degrade with transfer learning. The warm-up variance increased and the mean variance increased.

Figure 3:
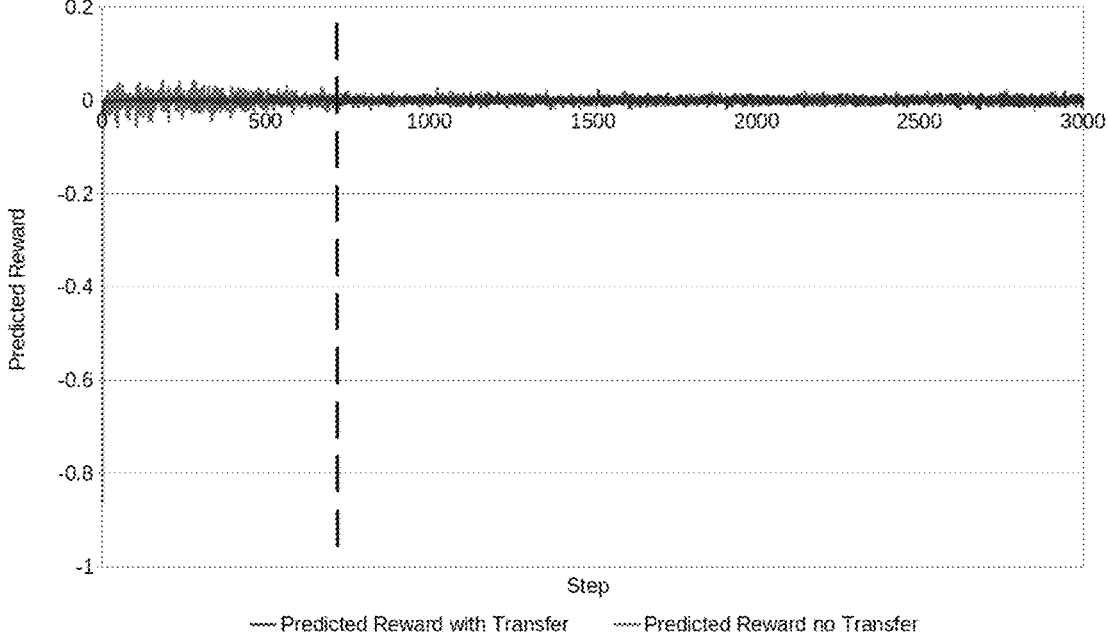
FIG. 3 shows a chart of predicted reward with and without transfer learning for building combination T-W.

FIG. 3 shows the intelligent optimization agent predicted reward behavior with and without transfer learning. Without transfer learning the predicted reward varies widely during the warm-up period, the duration of which is indicated on the graph by the dashed line. During this period of time, because the intelligent optimization agent Actor and Critic share knowledge, the Actor explores the action space almost at random. Since each action results in a change to the chiller set point this could cause considerable discomfort to the building residents. In this case the warm-up period lasts for close to three weeks.

With transfer learning from building W, the warm-up period was observed to be almost completely eliminated, reducing the potential for discomfort to the building residents. In both cases the predicted reward eventually tends to zero, as the intelligent optimization agent finds the COP optimum for the target building.

Figure 4:
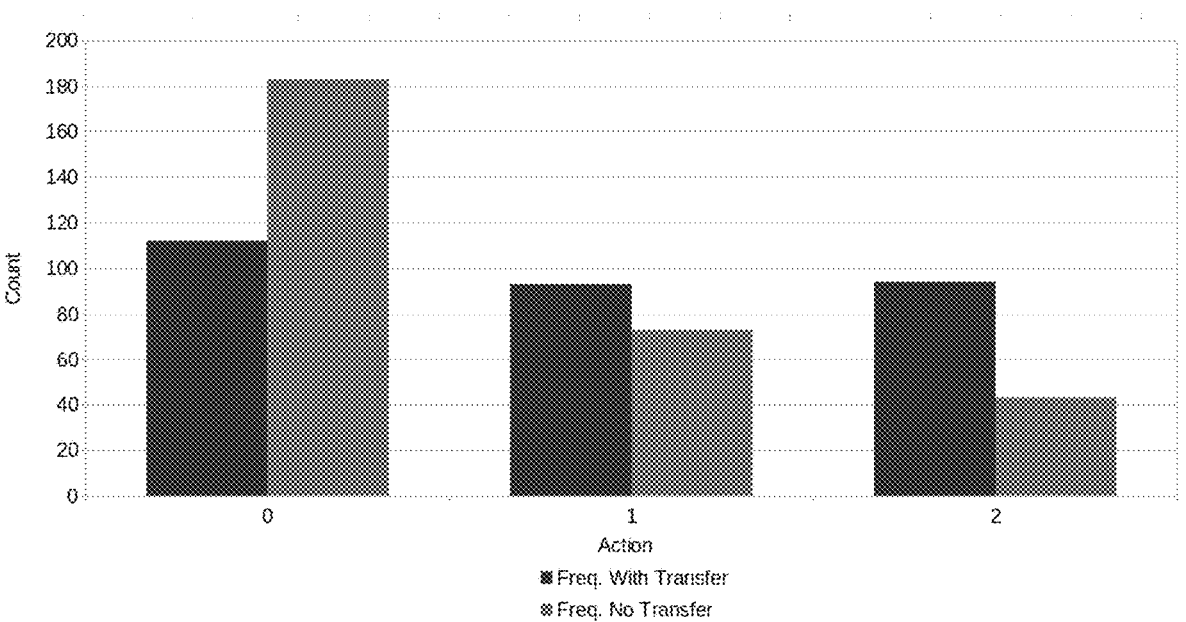
FIG. 4 shows a chart of frequency of actions taken by an intelligent optimization agent with and without transfer learning for building combination T-W during the warm-up period (first 300 steps taken).

FIG. 4 shows the distribution of actions taken by intelligent optimization agent during the warm-up period. Because the duration of the warm-up period varies with and without transfer learning, the first 300 steps were used.

With transfer learning it was observed that the actions chosen by the intelligent optimization agent during the warm-up period were much more evenly distributed between choosing to do nothing, and adjusting the chiller set point up or down to find the optimal operating conditions. This pattern of behavior leads to more gradual adjustments to the chiller set point, reducing the potential to cause discomfort to the building residents.

Figure 5:
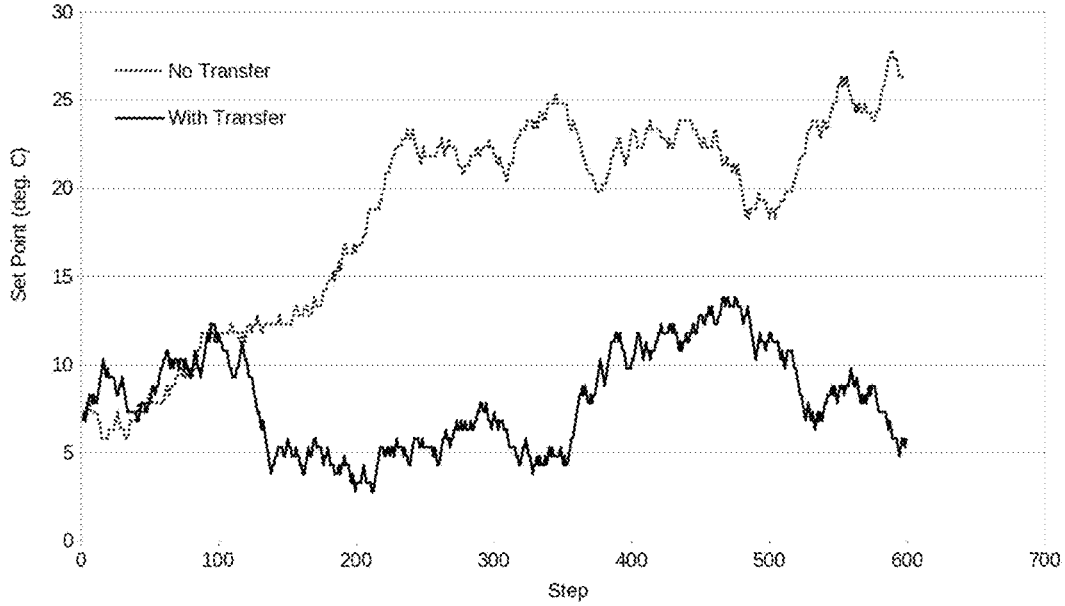
FIG. 5 shows a chart of set point behavior with and without transfer learning during the warm-up period for building combination T-W.

FIG. 5 demonstrates this behavior for the building combination T-W with and without transfer learning during the warm-up period. Without transfer learning the intelligent optimization agent actor-critic RL agent aggressively adjusts the chiller set point to higher and higher values in search of the COP optimum. Effectively, it turns off the cooling by pushing the chiller set point above 20 degrees Celsius. If this pattern of set points was enacted on an actual building, it would cause significant discomfort to the building residents.

In comparison, with transfer learning, the agent adjusts the set point much more conservatively, exploring values slightly above and below the initial set point of 7.3 degrees Celsius. This pattern of chiller set points would not cause significant discomfort to the building residents.

intelligent optimization agent was eventually able to find the same COP optimum both with and without transfer learning. Without transfer learning though, it took longer to get there, and chiller set point fluctuations were more significant. The primary benefit of using transfer learning from another building is the fact that it mitigates the risk of causing significant discomfort to the building residents during initial building commissioning, or during ongoing recommissioning as part of SOCx. An added benefit is the reduced energy cost expenditures that result from the much-shortened warm-up period.

It is important to note that the effectiveness of transfer learning among buildings depends on the choice of the transfer building. In our case building W appears to be the best transfer building, producing the most spectacular results with two different target buildings—T and H.

Figure 6:
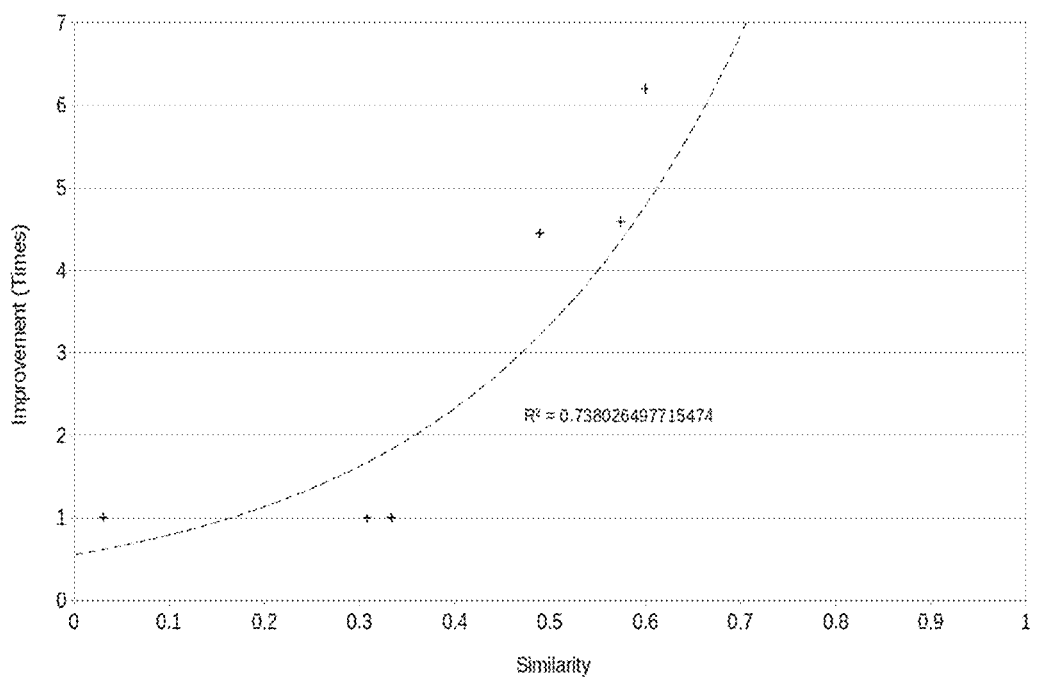
FIG. 6 shows a chart of Improvement (times) vs. Similarity plotted for the warm-up duration reduction.
Figure 7:
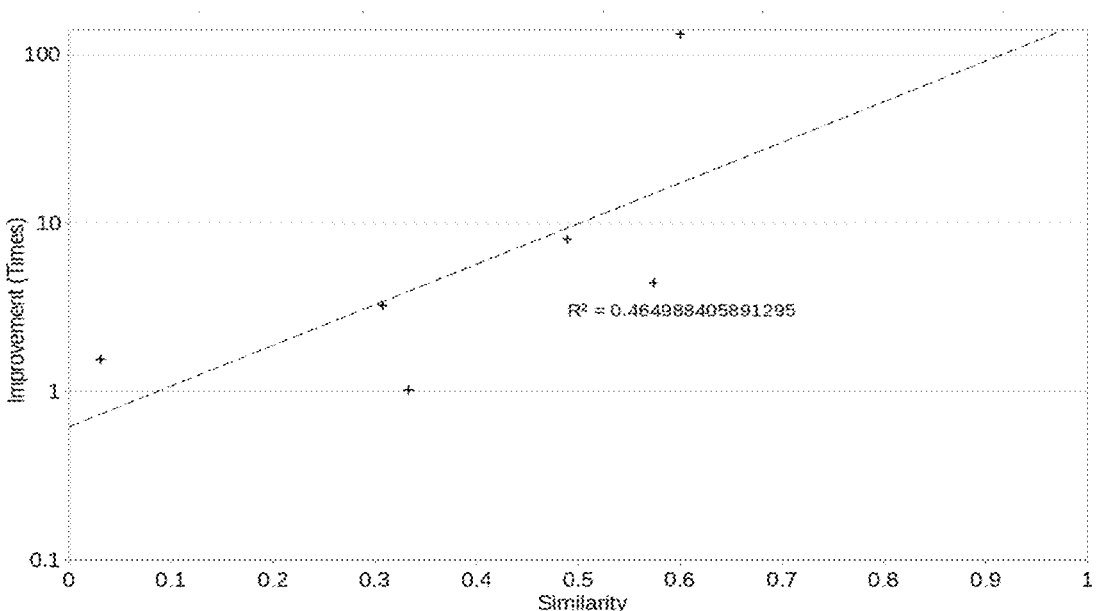
FIG. 7 shows a chart of Improvement (times) vs. Similarity plotted for the warm-up variance reduction.
Figure 8:
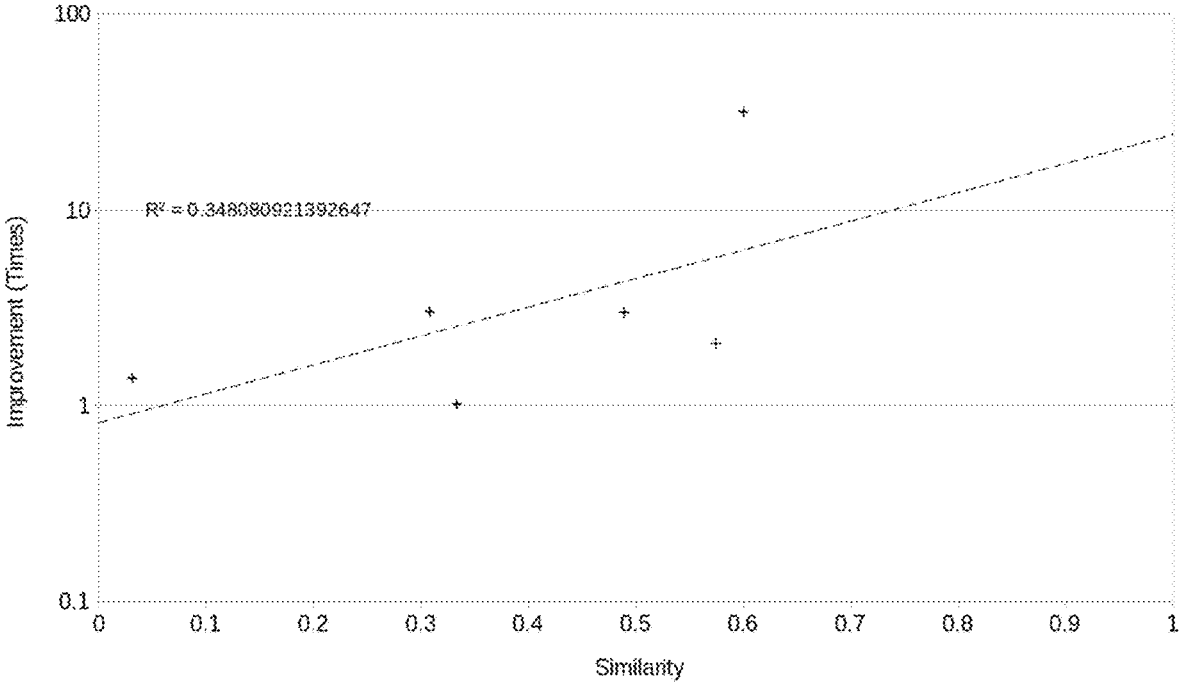
FIG. 8 shows a chart of Improvement (times) vs. Similarity plotted for the mean variance reduction.

FIGS. 6, 7, and 8 show the relationship between the amount of improvement (times improvement) and similarity for all of the key metrics. The overall trend in the data is shown using a dashed line. Note that for the Mean Variance Reduction (MVR) and Warm-Up period Variance Reduction (WUVR) the y-axis is logarithmic. It should be noted that the feature vectors of our buildings were observed to be relatively dissimilar (i.e. relatively far from the ideal similarity of 1). Similarity for our building combinations ranges from 0.03 (W-H) to 0.60 (T-W). For all metrics the overall trend shows significant improvement over this range, and the relationship appears to be exponential, with order-of-magnitude improvements achieved as similarity reaches 0.6.

For warm-up duration reduction, the coefficient of determination $R^2$ for the exponential model was observed to be 0.74 (see FIG. 6 supporting the notion that the relationship between similarity and this metric is exponential. For WUVR and MVR $R^2$ for the exponential model was observed to be lower at 0.46 (see FIG. 7) and 0.35 (see FIG. 8) respectively. This was observed to be due to a single data point (building combination T-W) that resulted in better-than-exponential improvement for WUVR and MVR. Overall, the exponential model best explains the observed relationship between similarity and our key performance metrics.

The best results were observed in those cases where the length of the transfer building feature vector was smaller than the length of the target building feature vector, and most transfer building features were statistically similar to target building features.

The worst results were observed in those cases where the length of the transfer building feature vector was larger than the length of the target building feature vector. This appears to result in only partial knowledge transfer, and reduced benefit from transfer learning The described method uses the intelligent optimization agent with transfer learning to greatly mitigate the optimization algorithm deployment risk to the building management company. The intelligent optimization agent can reduce the duration of the warm-up period by more than 6 times, reduce the variance observed during the warm-up period by up to 132 times, and reduce the overall mean variance by up to 32 times.

In some embodiments, the transfer building is selected to ensure that its feature vector is substantially the same size, or smaller than the feature vector of the target building. The feature vector of the target building contains statistically equivalent features to some or all of the features of the transfer building. However, in some embodiments, using even relatively dissimilar building feature vectors, can still lead to improvements in all key warm-up period metrics, and significant reduction of risk associated with the intelligent optimization agent deployment.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A system for optimization knowledge transfer between automated buildings, comprising:

an artificial neural network (ANN) operably connected to an intelligent optimization agent of a transfer building, wherein the ANN is configured to store optimization knowledge of the intelligent optimization agent of the transfer building, wherein the optimization knowledge is transferable over a communication network or storable on a portable storage medium via the ANN;

wherein the transfer building comprises sensor data stored within the ANN;

wherein a target building intelligent optimization agent is configured to leverage the stored sensor data and select an action from an action set;

wherein the action set comprises a plurality of set point events for a target building automated system;

wherein the optimization knowledge received from the transfer building comprises a plurality of inputs associated with a transfer building automated system;

wherein the target building intelligent optimization agent is configured to perform a target building energy optimization method, the method comprising:

receiving the sensor data from the transfer building;

processing the sensor data via multiple segments;

predicting the action for the target building automated system from the action set;

transferring the action to the target building automation system.

2. The system of claim 1, wherein the target building automated system comprises an auto-adjustable energy conservation system or an auto-adjustable energy conservation system.

3. The system of claim 2, wherein the auto-adjustable energy conservation system is a chilling system.

4. The system of claim 2, wherein the auto-adjustable energy conservation system is a boiler system.

5. The system of claim 2, wherein the auto-adjustable energy conservation system is a shading system.

6. The system of claim 2, wherein the plurality of inputs comprises a plurality of building sensor data excluding an adjustable parameter of an automated energy generation and conservation system of the transfer building automated system.

7. The system of claim 6, wherein the action is specified by a configuration file of the intelligent optimization agent, wherein the action is related to the adjustable parameter of the automated energy generation and conservation system of the transfer building automated system.

8. The system of claim 7, wherein the building transfer optimization method of the intelligent optimization agent further comprises sending the action to a building environment component operably connected to the auto-adjustable energy conservation system of the target building and configured to modify the adjustable parameters thereof.

9. The system of claim 6, wherein the building environment component uses the transfer building to predict a change in a target building state resulting from implementing the action.

10. The system of claim 9, wherein the building environment component generates a reward value comprising a difference between a calculated target building state generated by the intelligent optimization agent, adjusted for changes predicted by the transfer building, and a calculated transfer building state.

11. The system of claim 10, wherein the building transfer optimization method of the intelligent optimization agent further comprises receiving the reward value.

12. The system of claim 2, wherein the plurality of inputs comprises a sufficient number of inputs to calculate a configurable reward function of the building.

13. The system of claim 1, wherein the plurality of segments comprises an input segment that includes a configurable input layer that adjusts to the size of the target building and a hidden layer configured to have a same number of neurons as the input layer.

14. The system of claim 13, wherein the plurality of segments comprises a core segment having a common configurable number of hidden layers with a configurable, fixed number of neurons.

15. The system of claim 14, wherein the plurality of segments comprises an adaptation segment that includes a hidden layer, with a configurable fixed number of neurons, wherein the number of neurons is the same as in the core segment.

16. The system of claim 15, wherein the plurality of segments comprises an output segment that includes single output layer with a single output.

17. The system of claim 1, wherein the target building energy optimization method further comprises sending the optimization knowledge collected by the intelligent optimization agent of the transfer building to the target building intelligent optimization agent via an on-line communication network.

18. The system of claim 1, wherein the target building energy optimization method further comprises sending the optimization knowledge collected by the intelligent optimization agent of the transfer building to the target building intelligent optimization agent via an off-line method.

19. The system of claim 18, wherein the off-line method comprises storing the optimization knowledge in a file on a persistent storage medium.

20. The system of claim 19, wherein the target building energy optimization method further comprises manually uploading the optimization knowledge to the target building intelligent optimization agent.

* * * * *